(12) United States Patent
Nikain et al.

(10) Patent No.: US 12,333,464 B2
(45) Date of Patent: Jun. 17, 2025

(54) ARTIFICIAL INTELLIGENCE-BASED BUSINESS PROCESS MANAGEMENT VISUALIZATION, DEVELOPMENT AND MONITORING

(71) Applicant: AT&T Intellectual Property I, L.P., Atlanta, GA (US)

(72) Inventors: Mohammad Nikain, Atlanta, GA (US); Daniel Connolly, Suwanee, GA (US); Jiyuan Wang, Cumming, GA (US); Patrick Tagatsi, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 356 days.

(21) Appl. No.: 17/235,294

(22) Filed: Apr. 20, 2021

(65) Prior Publication Data
US 2022/0335362 A1  Oct. 20, 2022

(51) Int. Cl.
*G06Q 10/00* (2023.01)
*G06F 3/04817* (2022.01)
(Continued)

(52) U.S. Cl.
CPC .  *G06Q 10/063114* (2013.01); *G06F 3/04817* (2013.01); *G06N 20/00* (2019.01);
(Continued)

(58) Field of Classification Search
CPC .................................................. G06Q 10/0633
See application file for complete search history.

(56) References Cited

U.S. PATENT DOCUMENTS 10,636,006 B2   4/2020  Yan et al.
2008/0313595 A1*  12/2008  Boulineau ........ G06Q 10/06313
                                         717/101
(Continued)

OTHER PUBLICATIONS

"IEEE Guide for Taxonomy for Intelligent Process Automation Product Features and Functionality," in IEEE Std 2755.1-2019, vol. No., pp. 1-53, Jul. 16, 2019, doi: 10.1109/IEEESTD.2019.8764094. (Year: 2019).*

*Primary Examiner* — Hafiz A Kassim
*Assistant Examiner* — Zahra Elkassabgi
(74) *Attorney, Agent, or Firm* — Guntin & Gust, PLC; John G. Rauch

(57) ABSTRACT

Aspects of the subject disclosure may include, for example, providing a graphical user interface on a display device for interaction with operations personnel associated with a process to be performed; receiving, from the operations personnel, information defining one or more tasks to perform the process; receiving, from technical personnel associated with respective task of the one or more tasks, respective rulesets associated with the respective tasks, each respective ruleset defining procedures to complete a respective task, one or more of the respective rulesets implementing a machine learning algorithm to complete the respective task; displaying information about the one or more tasks on the graphical user interface during performance of the process; estimating, with an artificial intelligence process, a current status of the process, producing a current status estimate, wherein the estimating comprises estimating a status of the machine learning algorithm; and displaying process status information on the graphical user interface wherein the process status information is based on the current status estimate. Other embodiments are disclosed.

20 Claims, 10 Drawing Sheets

(51) Int. Cl.
*G06N 20/00* (2019.01)
*G06Q 10/0631* (2023.01)
*G06Q 10/0633* (2023.01)

(52) U.S. Cl.
CPC ............... *G06Q 10/063118* (2013.01); *G06Q 10/06312* (2013.01); *G06Q 10/06313* (2013.01); *G06Q 10/06316* (2013.01); *G06Q 10/0633* (2013.01)

(56) References Cited

U.S. PATENT DOCUMENTS

| | | | |
|---|---|---|---|
| 2018/0053127 A1* | 2/2018 | Boileau | G06Q 10/0631 |
| 2018/0373568 A1* | 12/2018 | Frost | G06F 9/45533 |
| 2020/0036687 A1* | 1/2020 | May | H04W 12/02 |

* cited by examiner

300

ARTIFICIAL INTELLIGENCE-BASED BUSINESS PROCESS MANAGEMENT VISUALIZATION, DEVELOPMENT AND MONITORING

FIELD OF THE DISCLOSURE

The subject disclosure relates to artificial intelligence-based business process management visualization, development, and monitoring.

BACKGROUND

Processes to be performed can be described as automated process flows with a linear relationship between a number of tasks to be performed. Task completion can be monitored to identify a status of the process along with status of the constituent tasks. Computer tools used by process managers provide a visual way to both participate in and monitor the semi- or fully-automated process flows.

BRIEF DESCRIPTION OF THE DRAWINGS

Reference will now be made to the accompanying drawings, which are not necessarily drawn to scale, and wherein.

DETAILED DESCRIPTION

Figure 1:
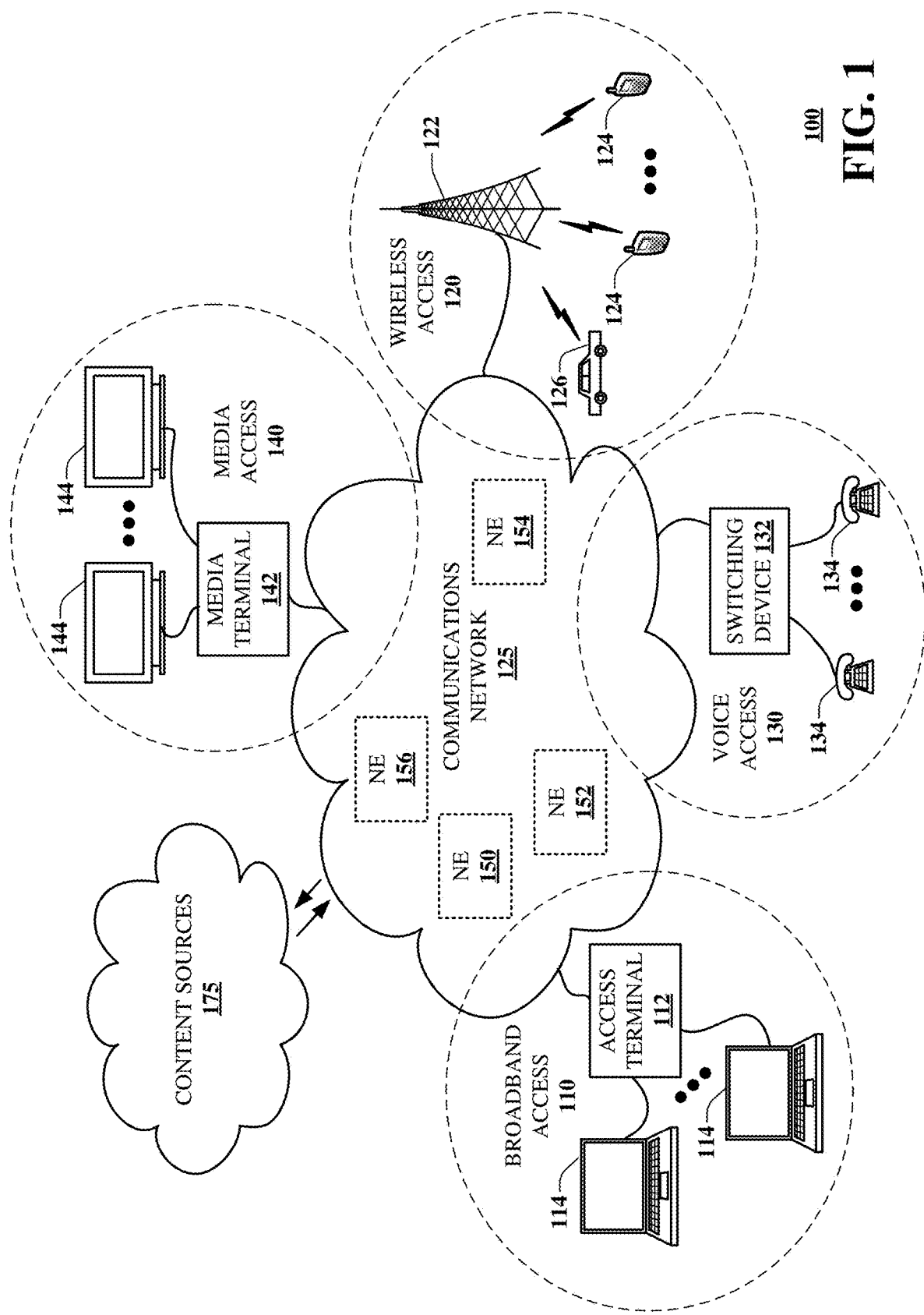
FIG. 1 is a block diagram illustrating an exemplary, non-limiting embodiment of a communications network in accordance with various aspects described herein.

The subject disclosure describes, among other things, illustrative embodiments for development and monitoring of business process management (BPM) tools and software. Other embodiments are described in the subject disclosure.

According to published reports, software issues related to poor quality software in the United States may cost in excess of $2.84 trillion. It is estimated that eighty percent of issues leading to customer dissatisfaction are traceable to poor understanding of requirements for the software by software developers. The consensus view on addressing the requirements issue for software development is to have the users or operators develop automated process flows in a visual and intuitive way so the operators can both participate in and monitor the semi-automated or fully automated process flows. Tools that exist in this area tend to focus on modeling a computer algorithm in some user-intuitive way. However, with proliferation of artificial intelligence (AI) applications, visualization of such process flows in the existing paradigm is not possible since artificial intelligence implementations often do not follow a deterministic path or algorithm.

Conventional BPM tools typically provide a drag-and-drop graphical user interface for a user to draw a process and then provide the same tool to monitor the progress of the process they designed. In general, such BPM tools have not fulfilled the original goals. In practice, the user grew frustrated with the interface, gave up and the work was relegated to a system engineering team. The system engineering team developed requirements and passed the development project to a development team. In effect, this result merely degenerates to the traditional model of software development but using a different tool. Experience has showed that the issue is not that, for example, writing Java syntax is complicated relative to using a drag-and-drop graphical user interface, but that the process algorithm itself or along with underlying data is complex. Therefore, in many organizations, substantial resources for information technology (IT) system architecture evolution have been spent without achieving a major improvement and essentially yielding one BPM system being replaced by another different, yet equally complicated system. In some instances, most of these designated replacements failed to actually replace the old systems and just resulted in yet another system being added to the portfolio. As a result of this evolution, each system has a different generation of BPM tools and none is in a position where the client has complete control of entering and managing the business processes into the system.

Embodiments in accordance with the descriptions herein provide a way to model and manage an AI-based system using a unique combination of project management tools which are used to manage human resources with business process management tools. The business process management tools are used to manage automated/software resources, yielding a highly intuitive way to manage AI-enabled programs. The system and method in accordance with these embodiments enable non-technical users start the development effort and seamlessly transition the effort to technical resources that can produce AI programs to fulfill those steps. Further, the same system can be used, inherently, to monitor and manage the processes. This can avoid surprises on project delivery and also does not require another set of instructions once the system is ready. This approach has a profound impact on addressing the requirement issue as well as providing a simple process of monitoring the software operation. As cost pressures and aggressive timelines require a software development organization to be more agile, this type of integrated development and monitoring is the most effective cost and timeline reducing means in software development for the foreseeable future.

One or more aspects of the subject disclosure include receiving from operations personnel for a process, information defining one or more tasks, the one or more tasks to perform the process and receiving, from technical personnel, respective rulesets associated with respective tasks of the one or more tasks, each respective ruleset defining procedures to complete a respective task. Aspects of the subject disclosure further include communicating information about a task between the task and an associated ruleset, including exchanging parameters and parameter values for the task or procedures of the associated ruleset. Aspects of the subject disclosure further include displaying information about the one or more tasks on a graphical user interface during performance of the process, displaying information on the graphical user interface about the respective rulesets during the performance of the process, displaying an indication of an error condition of a task of the process on the graphical user interface and initiating a corrective action to correct the error condition.

One or more aspects of the subject disclosure include receiving, by a processing system including a processor, information defining one or more tasks to perform a process, receiving information defining respective rulesets associated with respective tasks of the one or more tasks, each respective ruleset defining procedures to complete a respective task. Aspects of the subject disclosure further include communicating information about a task between the task and an associated ruleset, including exchanging parameters and parameter values for the task or procedures of the associated ruleset, and displaying information about the one or more tasks on a graphical user interface during performance of the process, wherein the displaying comprises displaying a Kanban for the process on the graphical user interface during performance of the process.

One or more aspects of the subject disclosure include providing a graphical user interface on a display device for interaction with operations personnel associated with a process to be performed; receiving, from the operations personnel, information defining one or more tasks to perform the process; receiving, from technical personnel associated with respective task of the one or more tasks, respective rulesets associated with the respective tasks, each respective ruleset defining procedures to complete a respective task, one or more of the respective rulesets implementing a machine learning algorithm to complete the respective task; displaying information about the one or more tasks on the graphical user interface during performance of the process; estimating, with an artificial intelligence process, a current status of the process, producing a current status estimate, wherein the estimating comprises estimating a status of the machine learning algorithm; and displaying process status information on the graphical user interface wherein the process status information is based on the current status estimate.

Referring now to FIG. 1, a block diagram is shown illustrating an example, non-limiting embodiment of a system 100 in accordance with various aspects described herein. For example, system 100 can facilitate in whole or in part a business process management system, using high level tasks at a task level and technical rules at a rule level, for visualizing and monitoring a process to be performed. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
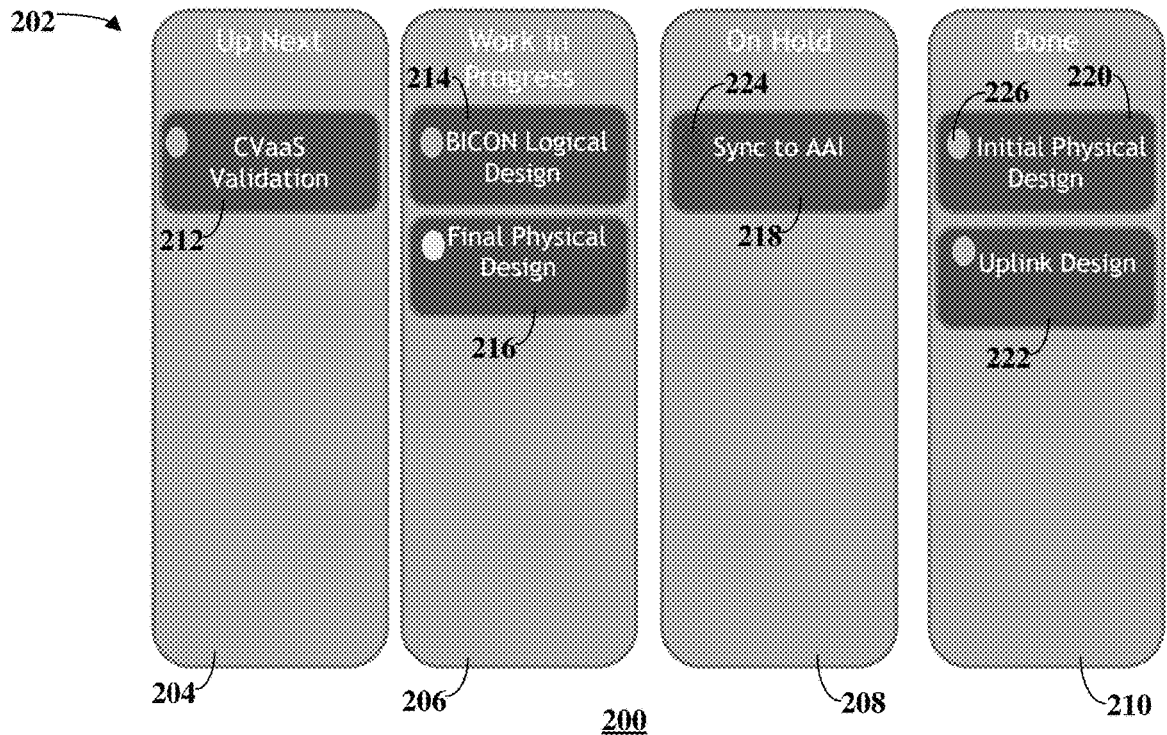
FIG. 2A through FIG. 2E are block diagrams illustrating an example, non-limiting embodiment of a graphical user interface (GUI) for a business process management (BPM) tool in a system functioning within the communication network of FIG. 1 in accordance with various aspects described herein.

FIG. 2A is a block diagram illustrating an example, non-limiting embodiment of a system functioning within the communication network of FIG. 1 in accordance with various aspects described herein. In particular, FIGS. 2A through 2E show an implementation of a business process management (BPM) development process using Kanban as the project mgmt. paradigm, with a rule-based engine as an artificial intelligence (AI) infrastructure and machine learning. The BPM development process may be a coordinated effort to create an automated system by, on the one hand, process managers who operate at a relatively high level, referred to as the task level, which is oriented toward the process and how the process fits into an overall business scheme, and on the other hand, by software engineers who focus on a very detailed level, referred to as the rule level, of individual steps of the process, with less awareness of the overall scheme. The two groups must communicate and cooperate and their knowledge and experience overlaps. However, for efficiency, they must specialize and necessarily have only limited awareness of the other's tasks.

The embodiments described herein enable users such as process managers to manage artificial intelligence-driven processes. The users are able to model the process according to management needs, specifying tasks that make up the process. This may be considered a task level or a high level of the process. The process is in turn modelled according to technical needs and rule sets for the artificial intelligence functionality as specified by software engineers. This may be considered a rule level or a low level of the process. Further, the embodiments provide a mapping between the two levels. The embodiments provide substantial benefits. For example, a Kanban, Gantt chart or other process management tool can be used to effectively manage an artificial intelligence process, which is inherently non-deterministic and unpredictable. Further, the embodiments enable effective participation by users or operators in the development of the processes. Currently, artificial process development is considered to complex or too specialized for operators to participate in directly. Still further, the embodiments provide a simple means to control and understand the process, which conventionally is difficult when artificial intelligence runs the process.

Embodiments described herein focus on automating a network operations process. However, the description can be equally expanded to any business process. The net result is that a non-IT user such an operations specialist in the business area in question, who knows the process but is not an IT specialist, can effectively design a process using a human-resource-based project management paradigm. Further, the operations specialist can use the same paradigm to subsequently monitor and manage the process, for example, using a Kanban.

In some embodiments, the system and method have three components. A first component includes the design and methodology to design a business process. An example of a business process is provisioning a service, such as a communication service on a communication network accessible by subscribers and other customers. The design of the business process may be implemented using project management tools and technology. Such tools and technology may include conventional tools such as Business Process Modelling Work Breakdown Structure (WBS), Gantt charts, Kanban, and others. A Gantt chart is a bar chart that illustrates a project schedule and interdependencies of operational steps. Examples of Gantt charts show tasks to be performed on a vertical axis and time intervals on a horizontal axis. A Kanban is a project management system in which supply of components is regulated through use of an instruction card sent along the production line. In an IT implementation, the Kanban or instruction card exists virtually. The design of the business process is conducted in a way that the design may automatically produce artifacts that can be used by an AI-trained IT-team.

A second component of the system and method includes the design and methodology to convert such artifacts to isolated areas for rule-development for an AI implementation of the process management solution. This effectively allows an IT team to develop segments of the software process without having to learn the end-to-end process, reducing complexity of the development effort for the IT team.

A third component of the system allows monitoring of the process, once it is developed, using the same project management methodology. Due to the AI nature of the system that is developed, the system will not follow a deterministic path and therefore machine learning is used to predict the actions of the AI system and update the project process in a way that is consistent with the project management infrastructure.

The net effect of use of these components is that client seeking to develop a business process management system face a process which is analogous to "explaining the job to a group of expert technicians and then periodically asking them for their expert opinion on where the project is," as opposed to "specifying detailed instructions to a group of robots and then trying to analyze their programming to see what is going on."

Conventional processes or tasks typically comprise a number of steps that must be complete for completion of the process task. Conventionally, the steps are completed according to some sequence, one step at a time. The process and its constituent steps are conceived in a linear fashion. However, often there is no direct linear relationship between respective steps. Instead, each individual step of the process may have its own input and output criteria. Therefore, the set of tasks may be defined according to inputs from other tasks.

When manual processes are automated, the processes may be reimagined. However, often when processes are automated, a former manual process is converted to an automated process simply by automating the manual tasks. Instead, in a step assembly operation, it is possible to define the tasks that make up a process in software according to inputs and an output to be achieved. The tasks can then monitor their input conditions and the satisfaction of input conditions, and then proceed to execute automatically.

Further, the language used to define a task, and what the task performs, have conventionally been the same. In accordance with some embodiments described herein, a task may be defined in a high-level language that a user understands. A graphical user interface (GUI) may be used by the user to define the tasks and the process. The user, by means of the GUI, sees the tasks that form the overall process and what tasks, or inputs are ready and not ready, what is queued next, etc.

The high-level rules that define a task are mapped into another rule operating at a lower level. The lower-level rules deal in technical details required for completing the task. Such rules define subtasks that must be completed, variables and relationships among variables and tasks. Thus, a process or workflow may be divided into two levels. The task level is at a relatively high level that deals in terms and language understandable by a human operator. The rule level is at a more detailed, technical level and described in terms with which a programmer or developer is familiar. Any given process may be modelled at the task level according to needs of management and thus defined in terms of tasks defined by users or operators of the process. Further, the process may be modelled at the rule level according to technical needs and operations such as artificial intelligence rule sets as may be defined by individuals responsible for system engineering and development. A methodology, then, provides a mapping between the two levels. Individuals responsible for the low-level system engineering map task and rule parameters, thus enabling some updates to task parameters. A machine learning function analyzes historical data and completes the mapping by predicting what the rules will do.

As an example, a process includes two tasks. A first task is described at the task level or operator level as Task A=load configuration for a service; Task B=test the service. The user or operator can define a rule at the task level as, "when load configuration=complete, then Test System=ready." The operator thus can define rules at the task level but may not know exactly what individual steps the rules require. Underneath, at the rule level, there are tasks that are tied into the load configuration step and the task step and those tasks have a lot more detail. The detailed task that dictates testing the configuration does not know when to trigger; it just knows that at some point it will have to trigger. That rule is defined at the task level, not at the lower, detailed rule level. But once the task is triggered, the task knows exactly how to test the configuration and report back the result of the test and whether the task is complete.

Embodiments in accordance with the descriptions herein provide unique advantages. A Kanban, Gantt chart or other tool for monitoring a process, and which expects as an input a well-defined process, can be used to effectively manage an artificial intelligence (AI) process, which is inherently unpredictable. Further, the disclosed system and method enable effective participation of users and operators, interacting with the GUI at a high level, in development of a new process or modification of existing processes. Conventionally, existing AI processes are often too complex or operate at such a low level for operators to fully participate in directly. Further, the disclosed system and method provide a simple means to control and understand the process. Such control and understanding may be more difficult given the use of artificial intelligence.

Referring now to FIG. 2A, the drawing figure shows a graphical user interface (GUI) 200 for a business process management (BPM) tool 202. In the example, the BPM tool 202 is a Kanban. Kanban is a workflow management method or apparatus for a user to define, manage and improve a business process or a service that delivers an end result. Kanban enables a user to visualize work processes and the interaction over time of such processes. The exemplary BPM tool 202 is embodied as a Kanban board with four columns labelled Up Next column, Work in Progress column, Oh Hold column and Done column. In other examples, the BPM tool 202 may be embodied as a Kanban but have different numbers of columns with different assignments and labels. In yet other examples, the BPM tool 202 may be embodied as a different type of tool such as a Gantt chart or a Work Breakdown Structure (WBS).

The BPM tool 202 may be used for project management of a process. The BPM tool 202 may be implemented as a set of instructions and associated data for controlling one or more data processing systems. The BPM tool 202 establishes the GUI 200 for interaction by a user. The BPM tool 202 stores data defining tasks and parameters.

One or more human users or operators create the tasks that form the process. The users define user-level tasks. The user-level tasks are the functions or operations that must be completed or may be optionally completed as part of the process. The user-level tasks may be defined by parameters that are meaningful at the user level. As an example, a process may include steps of (1) shipping a device to a location, (2) load the correct configuration into the device and (3) test the configuration on the device. The user uses the GUI 200 of the BPM tool 202 to define three separate tasks, one for each step of the process. The user may further specify parameters for each task. For example, the task of "ship the device" may be specified with a parameter of an arrival date or a parameter specifying that the device is connected to a network, which may have parameter values of Yes or No. Oher parameters may include, for example, whether the device is damaged, again with possible parameter values of Yes or No. For the task of loading the device, the parameters may include a software revision identifier, or a role for the device, such as a server to be operated as a router or a firewall. The user defines the parameters and the parameters become a part of the task that the user has defined. The parameters are generally focused on managing the task and are not focused on the data the task is managing. The tasks and processes are pertinent to the user or operator at the task level.

In embodiments, each task has at least the following parameters. A first parameter for a task is a state, such as up next, work in progress, on-hold and done in the illustrated example. Other values for the state parameter may be specified as well, such as overdue, ran into a problem or ready. The state reflects a current condition of the task and the state may be updated as the process continues from initial stages to intermediate stages to final stages. The state of the task represents a primary categorization for the task at any given time.

A second parameter for a task is a name or other identifier of the task. The name or identifier may be used to specify or reference parameters of another task. The name or identifier is useful as an informative tag for the user and also for cross referencing the task to other tasks that may have a dependency relationship with that task. That is, another task may depend on the current task, or the current task may depend on one or more other tasks. The name or identifier is useful for this cross-referencing.

A third parameter for a task is any dependencies that task may have. Examples of dependencies include a specification that the task must run after another task; or the task must start with another task; or the task must end with another task. Each task can have any suitable number of parameters and the parameters may be related to the specific nature of the task. Examples of additional parameters for a task include a time to complete the task and a status for the task. Example status values for a task may include on target, behind schedule, in jeopardy, etc., or simply red, yellow and green, or other colors or symbols for display on the GUI 200.

The data defining a task and its parameters may be maintained in any suitable format. In an example, a task and its respective parameters is stored in memory as data in adjacent storage locations. In another example, the task and its respective parameters are arranged in a predetermined data structure for rapid and reliable data manipulation and modification. Any appropriate data structure may be used. The data defining the tasks may be centrally stored on a single data processing system or computer, or the data may be stored remotely or on a cloud computing system accessible by multiple users over a network.

In embodiments, every task has a parameter, and every parameter has a value. As an example, a task may be referenced as Task A, install.status=complete. This enables Boolean expressions to be defined, such as if (install.task.parameterName=value) then task is ready. For each task, there is a trigger condition which may be a Boolean condition that specifies the conditions that must be met. A first example may be written as:
(TaskA.parameterB=value1 AND TaskC.parameterD=value 2)
(IF Task1=Complete AND Task2=Complete, THEN . . . ) BUT (IF Task2≠Complete)
THEN             Task1.must.be.Complete            AND Task5.must.be.Complete).

Any suitable combinations of tasks, parameters and values may be specified by the user.

The user can use the GUI 200 and associated software of BPM tool 202 to specify tasks and parameters and values. The user can specify a new task, one or more new parameters, parameter values, etc., for a process. Further, the user can specify dependencies. In an example, the process and tasks may be specified in JavaScript computer language. However, any suitable syntax or format or tool may be used for specifying the process at the task level used by the user or operator.

In the example of FIG. 2A, six tasks have been defined. A CVaaS Validation task 212 has a Up Next state 204. A BICON Logical Design task 214 and a Final Physical Design task 216 have the Work In Progress state 206. A task Sync to AAI 218 has the On Hold state 208. An Initial Physical Design task 220 and an Uplink Design task 222 have the Done state 210. Thus, the GUI 200 displays a series of graphical shapes as state graphical representations of the possible states of tasks in the Kanban. The rectangular graphical objects for the Up Next state 204, the Work In Progress state 206, the On Hold state 208 and the Done state 210 form state graphical representations on the GUI 200. Similarly, the rectangular graphical objects within the state graphical representations, including for example, CVaaS Validation task 212, the Final Physical Design task 216 and the Initial Physical Design task 220 form task graphical representations of each respective task. While rectangular graphical objects are shown in the exemplary GUI 200, other shapes of any suitable appearance may be used to the task graphical representations and the state graphical representations.

In exemplary embodiments, the tasks shown on the GUI 200 have color-coded status indicators. Thus, the Sync to AAI task 218, which has the On Hold state 208, has a status indicator 224 that is colored red to indicate a critical status. Similarly, the Initial Physical Design task 220, with a state Done 210, has a status indicator 226 to indicate that all is in order. The status indicators such as status indicator 224 and status indicator 226 provide clear and quickly discerned visual status for each task.

Figure 2B:
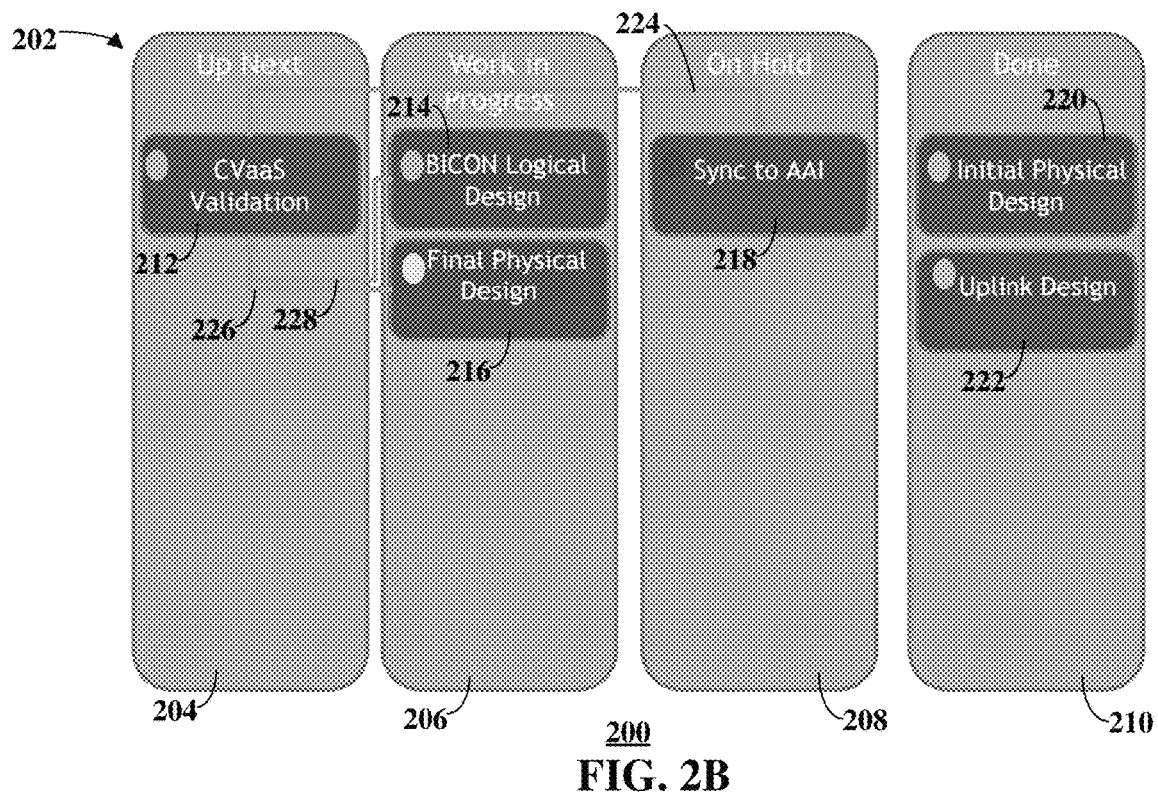

FIG. 2B shows further view of the GUI 200 for the BPM tool 202. The current state data of a task is used to properly draw the tasks on the correct Kanban section. As the status of a task changes, such as from Work In Progress state 206 to On Hold state 208, the task is visually moved on the GUI 200 to appear on the correct state.

Further, GUI 200 shows dependencies for respective tasks. In the illustrated embodiment, dependencies are shown as arrows between respective tasks. Thus, an arrow shows that Sync to AAI task 218, which has a current On Hold state 208, is dependent on CVaaS Validation task 212. Similarly, CVaaS Validation task 212 is dependent on both BICON Logical Design task 214 and Final Physical Design Task 216, as shown by arrows in the drawing figure.

Dependencies control when tasks are scheduled. If a task is dependent on another task, the nature of the dependency will control timing of work on the tasks and completion of the tasks. For example, if a dependency requires that an exemplary Task A must be completed before an exemplary Task B can begin, then Task B will not begin until the state of Task A shows the task is completed. Task B may be maintained in a state such as Oh Hold state 208 or other suitable state to show its current condition. Similarly, if a dependency requires that two tasks complete at the same time, the two tasks will be temporally linked in that manner.

In an embodiment, the GUI 200 may be manipulated to display the dependencies. For example, by clicking a task such the CVaaS Validation task 212, a user may select that task and cause the arrows to be displayed as shown in FIG. 2B. The arrows clearly show dependencies for the task, including other task on which the CVaaS Validation task 212 depends and other tasks which depend on the CVaaS Validation task 212. Further details about each task may be displayed on the GUI 200 by clicking on or otherwise selecting a task as the task is displayed on the GUI. Further details may be displayed in any suitable manner, such as text adjacent to the select task or on another portion of the GUI 200.

Figure 2C:
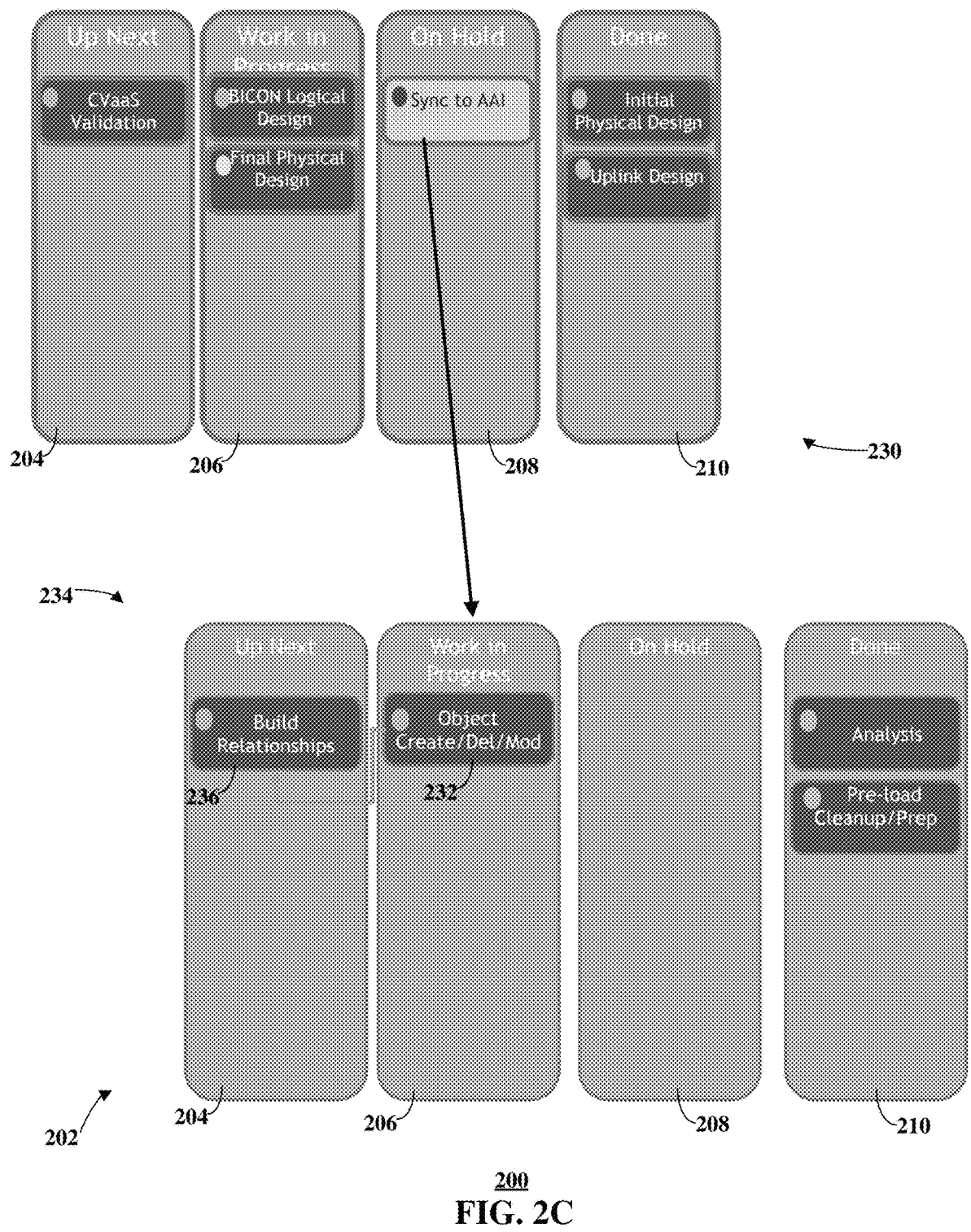

FIG. 2C shows a further view of the GUI 200 for the BPM tool 202. FIG. 2C illustrates that, in accordance with some embodiments, tasks may be nested within other tasks. In FIG. 2C, the tasks of FIG. 2B, including CVaaS Validation task 212, BICON Logical Design task 214, Final Physical Design Task 216, Sync to AAI task 218, Initial Physical Design task 220 and Uplink Design task 222 are collected in a first Kanban 230 as a group and are all nested within Object Create/Del/Mod task 232 on a second Kanban 234. The task Object Create/Del/Mod 232 has a state 206 of Work in Progress. A task Build Relationships 236 is dependent on the Object Create/Del/Mod task 232.

The first Kanban 230 with the group of tasks and the second Kanban 234 are on the same level, the task level. The tasks of the first Kanban 230 are illustrated as being on a different user level than the second Kanban, and the first Kanban 230 includes multiple tasks. A user may select a task, such as the Object Create/Del/Mod task 232 by, for example, clicking on the GUI 200 and the selection of the task will display sub-tasks as in FIG. 2C and additional information about the sub-tasks. Any number of tasks may be included in a group and any number of levels may be nested. For example, the second Kanban 234 may be nested within yet another higher-level Kanban. The use of nesting in the GUI 200 and the BPM tool 202 and the showing of dependencies enables clear display to the operator information about the current state of the process modelled by the GUI 200 in the BPM tool 202. The nested tasks, however, are all on the task level. The nested tasks may be arranged in a hierarchy of tasks, within the task level. The nested tasks are not on the lower, the technical level, also referred to as the rule level.

Figure 2D:
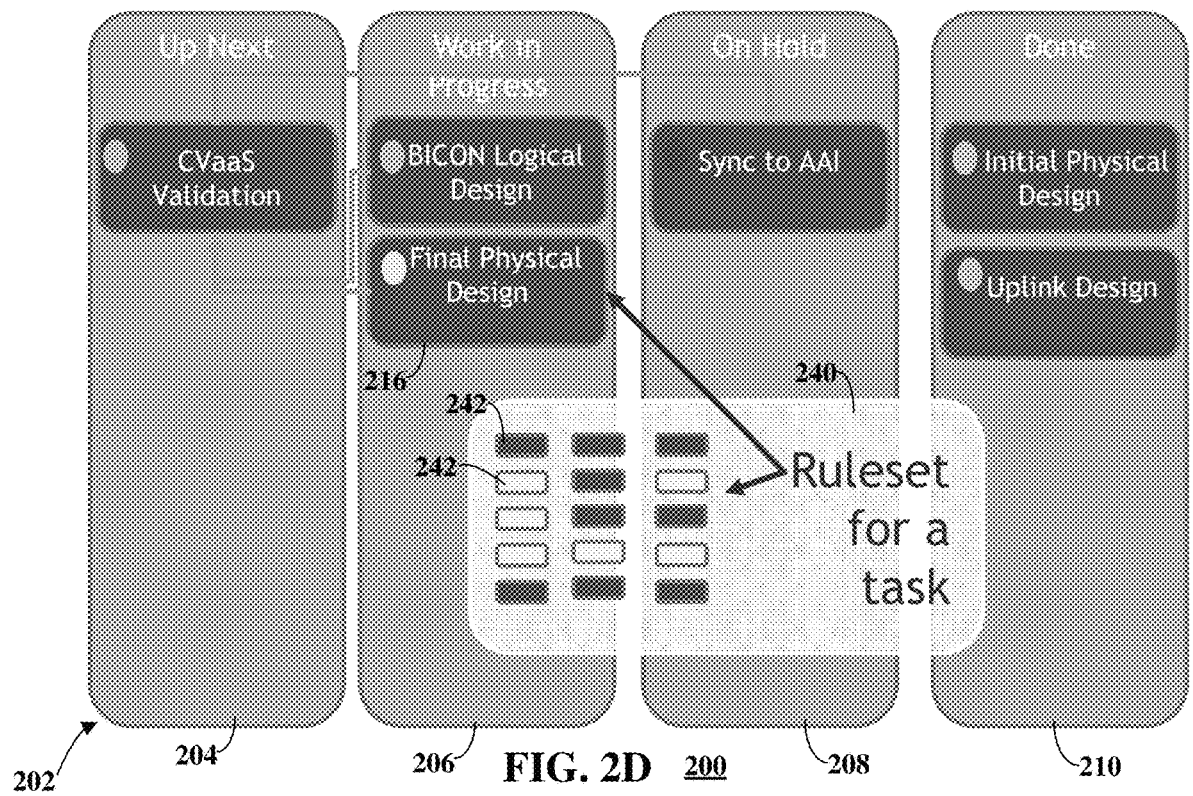

FIG. 2D illustrates a relationship between the task level and the rule level in the BPM tool 202 as embodied in the GUI 200. Each task at the task level is associated with a set of rules. Each task definition is passed to a delivery team, made up for example, of system engineers or developers, to develop rules to implement the task. In some embodiments, at least some rules of the rules to implement the task are artificial intelligence (AI) programs. An example of an AI program suitable for performing the tasks in conjunction with the BPM tool 202 is a neural network. For example, a ruleset is developed including AI programs to read and write data, expose an application programming interface (API), and other operations required to perform the task. The ruleset must also update the task parameters as defined by the user as needed. Those updates may control how the tasks appear on the Kanban board. The rules are independent pieces of logic, so one cannot readily predict when each will trigger in the process of completing a task. Moreover, AI programs may be non-deterministic, meaning that the outcome of the AI program can not be determined based on a specific state or set of inputs. Most real-world environments are not deterministic but are classified as stochastic. Stochastic refers to a variable process where the outcome involves some randomness and has some uncertainty. The artificial intelligence in the system emerges out of the complex interactions of these individual rules.

Thus, in the example of FIG. 2D, Final Physical Design task 216 is associated with a ruleset 240. Each task has an associated set of parameters, such as state, name, and dependencies, as well as an associated set of rules. The ruleset is a group of rules that are directly tied to the task. Each rule or group of rules has conditions and variables and defined triggers. The ruleset has a known address. In an example, the ruleset has an assigned Hypertext Transport Protocol (HTTP) address. Other types of addressing and interfacing may be substituted. The task name may be used in a uniform resource locator (URL) to invoke the ruleset. In this manner, the task knows where the ruleset is and can invoke the ruleset directly. No further configuration is necessary to tie the ruleset to the task. The ruleset may be a computer program that is located at a URL. When the task name invokes the URL, the ruleset is accessed. By virtue of putting the name on the task, the BPM tool 202 knows that URL of the file is associated with the ruleset. Thus, the task is associated with parameters including a name, and the name is associated with the ruleset at the rule level for the for task.

When any aspect of a task changes, the ruleset can be readily updated. For example, if a task is moved or if a variable within a task is updated, a standard command is set to the URL associated with the task. The command will issue a message defining the change and the task within which the change occurred. The task, such as Final Physical Design task 216, may be thought of as a computer program or routine operating on a processor system. The associated ruleset, such as ruleset 240, may be thought of as a separate computer program or routine running on a processing system. As noted, the ruleset 240s or individual rules of the ruleset 240 may be AI processes. When there is a change to a task, the task will make a call to the ruleset program and include the parameters for the change in the call. For example, a task dependency may change, or another task on which the task is dependent could complete, changing task parameters. The advance of time could cause a change, if a due date for a task is exceeded so that the task becomes past-due. Or a user could provide an input that causes a change to the task. In response to the change, the task notifies the ruleset. The ruleset is doing all the automated work to complete the steps or operations of the task. In this way, the ruleset gets notified that the task has been changed at the task level. The ruleset can similarly respond back to the task that the update has occurred. The rulesets do not communicate with each other. The rulesets only communicate with tasks. Tasks can communicate with each other. The communication between the task at the task level and the rules at the rule level may be in the context of the task parameters.

In an example, a parameter of a task changes. This change in the parameter may be due to any other change in the system, such as completion of a predecessor task or an input from a user, or other reason. The task notifies the ruleset of the change to the parameter. In response, the ruleset responds by following the rules at the rule level. Upon completion, the ruleset does not notify any other ruleset. The ruleset notifies its associated task with information about completion of the rules of the ruleset. The ruleset notifies the associated task by updating a task parameter. The changed task parameter might cause another task to trigger and update a parameter, which is communicated to the ruleset associated with the other task, causing the other ruleset to proceed.

The noted arrangement imposes a discipline between a project manager who is defining and arranging task and dependencies for the business process and developers who define and implement the ruleset. The developers can only receive parameters or instructions from the tasks and report back to the task what a ruleset has done in the context of what the task does. The project manager, through the task definition, can respond and another rule can be triggered.

In this manner, the business process management tool 202 can control a process only by knowing some high-level parameters. If there is an issue, such as a ruleset that does not function properly, it will be within one task. The ruleset will affect only the task that call the ruleset. This can make it easier to troubleshoot a process, task or group of tasks that fail or to maintain and control the overall process.

In FIG. 2D, the rules of ruleset 240 are based on the tasks defined by the operators who design the process at the task level, as shown in FIGS. 2A-2C. The operators have knowledge of the overall process to complete and design individual tasks, and an order for the tasks, to perform the process. Tasks are defined by, among other information, a name, dependencies, and a state, which will change over time. Each task definition is passed from the operators to the delivery team, including system engineers and developers, to develop rules to implement the task. For example, a rule set is developed to read and write data, expose APIs, and other operations required to perform the task. Further, the rule set must also update the task parameters defined by the user as needed. As a rule is performed and produces an effect on a parameter, the parameters are updated and the rule is arranged to communicate the updated parameter to the task operation on the task level. The updates control how the tasks are shown on the Kanban board. For example, after an update, a task may move from an On Hold state 208 to a Work in Progress state 206. Rules are independent pieces of logic, so one cannot readily predict when each will trigger in the process of completing a task. The rules are generally performed in a predictable order based on completion of rules and, thereafter, completion of tasks. This is illustrated in FIG. 2D as an ordered array of rules 242 forming the ruleset. Respective rules must be completed before subsequent rules can be triggered. However, an artificial intelligence (AI) system or process emerges out of the complex interactions of these individual rules.

Figure 2E:
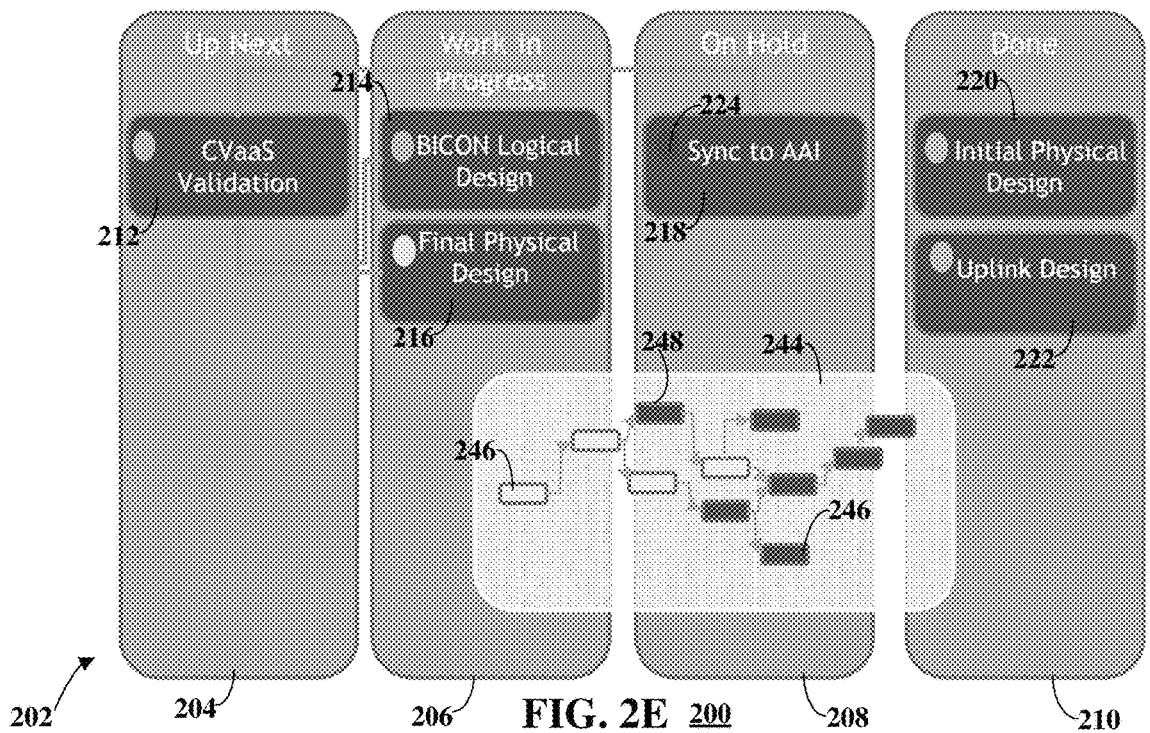

FIG. 2E illustrates a machine learning (ML) level of operation of the business process management system. When a project manager reviews a project's status or current state, the project manager may rely on a workflow or flowchart to see what steps or tasks are planned and in what order. When a workflow is prepared, it is clear what happens. The order of completion of steps or tasks is clear and according to the workflow. Tasks follow in order, according to the workflow. Dependencies are defined by the workflow.

However, in a system and method such as illustrated in FIG. 2E, it may be unclear what tasks have been completed and what tasks remain to be completed. The rules may include non-deterministic features such as AI environments or programs. The business process management tool 202 includes a ruleset 244 including a number of rules 246. A rules engine, configured as instructions and data operating on a processing system, implements the ruleset 244 at the rule level. The ruleset 244 is generated by or received from systems engineering personnel based on task descriptions developed at the task level by operators. In some embodiments, the rules include one or more AI embodiments such as neural networks that respond to expected inputs and outputs. The rules engine interprets the rules, identifies inputs, waits for inputs to be satisfied and triggers the rules to produce an outcome.

With the ruleset operating at a different level from the task level, the flow of operations may not be clear. The evident status or run state of a process may only show that a certain number of tasks have been completed and a certain number of tasks remain to be completed. The rules that form the ruleset decouple the process from a stepwise linear operation. Every rule specifies that, if the preconditions for the rule are met, the rule is triggered and the operation is performed. Otherwise, the rule does not run. But it cannot be known ahead of time in what order the preconditions for a rule will be met. Generally, each condition is being tested continuously. As soon as all conditions for the rule are met, the rule is triggered. Sometimes, a rule is triggered early. Sometimes a rule is triggered late. A change of a condition could trigger multiple rules simultaneously. There is no visual flow like that of a flow chart for use by an operator. Rules do not line up as shown in a workflow since the rules are in some cases non-deterministic and activate based on particular circumstances. One cannot always predict which order the rules will activate.

As a result, there is no predictable flow like a flow chart or a workflow. A rule engine is simply looking for conditions to be met to trigger a rule. Therefore, it may be difficult to determine reliably what order and timing might occur in the process flow. This is generally true of an artificial intelligence system. Operation of such a system may be unclear or unknowable or unpredictable from outside the artificial intelligence system. Rules may trigger in unknown order and result in different outcomes and different internal processes on the way to completion of the overall process. If an artificial intelligence component is added, there is an expectation that the system will be innovative and accomplish a process in ways that were not necessarily programmed into the system. On the other hand, the system must be monitored and controlled.

The machine learning (ML) process monitors what processes are occurring over time. The ML process or system will learn over time what conditions lead to what kind of outcomes. From that information, the ML process can predict what rules will trigger, and in what order. The ML system can predict a flow for a process. The ML system uses a training set of inputs and outputs to determine patterns and significant parameters and use the patterns to make future predictions.

In this example, the ML system will predict which rules will run and in what order, before the rules run. The ML system will tell the operator, at the task level, the current state of the process, or a prediction of the current state. The ML system can make predictions on how long rules and tasks will take to complete because the ML system has information about required duration for such rules and tasks. The ML system gives a view to the operator of current status, time remaining, and ordering of processes, based on predictions. The ML system can draw a timeline showing process status, how rules execute, and predict if a process is on schedule, behind schedule or ahead of schedule, and what would be likely outcomes.

Thus, the machine learning system will get trained on previous executions and can be used to predict how the rules will line up. Hence, the ML system can draw a timeline of which rules executed (definitive) and which order will they execute for the remainder of the task (probabilistic, based on machine learning). The net result is that ML can predict the currency of the task, time to completion, how will it complete, etc.

In an embodiment, the GUI 200 may be actuated to provide information to an operator about a process executing in the BPM tool 202. The operator can select a task, such as Sync to AAI task 226 to learn about the task. Selecting the task may be done using any suitable method, such as by clicking a mouse associated with a screen displaying the GUI 200, touching touch screen displaying the GUI 200, and others. Selecting the task may display a menu such as a popup menu. Selecting the task may enable displaying of dependencies on other tasks. Thus, in FIG. 2E, it can be seen that the task Sync to AAI 226 has the On Hold state 208. Further, the task is on hold because the task is dependent on CVaaS Validation task 212 which in in the Up Next state 204. The CVaaS Validation task 212 in turn is waiting on completion of two tasks that are in the Work In Progress state 206, including BICON Logical Design task 214 and Final Physical Design task 216.

Further, the GUI 200 may display ruleset 244. Individual rules 246 may be highlighted or otherwise emphasized or deemphasized to indicate the state of the process. Thus, in the illustrated example, rules in the ruleset 244 which have not yet completed, or which are predicted to be uncompleted, are show shaded dark. In contrast, rules in the ruleset 244 which have completed, or which are predicted to be completed, are changed on the GUI 200 and become shaded light. The display of the ruleset 244 may be based on a machine learning estimate of the state of completion of the process and of the individual rules that form the overall process.

The GUI 200 provides a benefit for trouble shooting a process. In an example, the progress of the process may be illustrated on the GUI 200. In the event of a problem with the process, the displayed ruleset 244 may provide an indication of an error condition. For example, if a rule 248 is predicted to be completed by the ML system, but is not yet completed, the rule 248 as displayed on the GUI will remain shaded dark. This can provide the operator or technicians an indication of a problem with the task covered by the rule. In turn, the operator can investigate the status of the task and take corrective measures to correct the error condition and resume performance or completion of the task. For example, if the task if performed remotely, the operator can dispatch a service crew may to correct the error condition. This may require changing an installation of equipment or installing new or additional equipment. In another example, if the task or equipment performing the task is under computer control, a signal may be dispatched over a network to correct the condition. For example, the operator may initiate a program to correct the error condition and the program will cooperate with the faulty task or equipment to correct the problem. A processing device operating in response to the program may send, over a network, a signal to correct the error condition. An example of such a signal is a reset signal for a task that is in an error state. Once the condition is corrected, the necessary inputs to the rule 248 will be satisfied and the rule 248 will trigger. This will enable the process to continue and complete as normal.

The ability of the ML system to reliably predict a current status of the process when there is no actual knowledge of the process because of the randomized nature of the artificial intelligence system, is used to inform the operator about current status and to identify problems or abnormal conditions in the process. This information from the ML system than may be used to initiate a correction to solve a problem.

A system and method in accordance with some embodiments described herein include a self-assembling set of tasks that are arranged into a flow. The tasks are one level of a system for managing a process. The system includes a high level or a task level and a low level or a rule level. Tasks at the high level are at a project management level. Tasks or rules at the low level are at a technical level. Communication is restricted so that the low-level tasks can only communicate through low-level tasks. Communication is through parameters passed between tasks at the task level and rules at the rule level. This forces the rulesets to speak a standard language, or to use a common format for communication of data and parameters.

Relationships are restricted so that rules on the rule level cannot communicate or share information with one another. The rules on the rule level can share information with tasks on the task level that have called or instantiated the rules. The tasks are arranged with dependencies to be able to control the overall process without all rules and all tasks being in communication. This enables processes to be isolated, tested, corrected if necessary and improved so that the overall process can be improved.

Figure 2F:
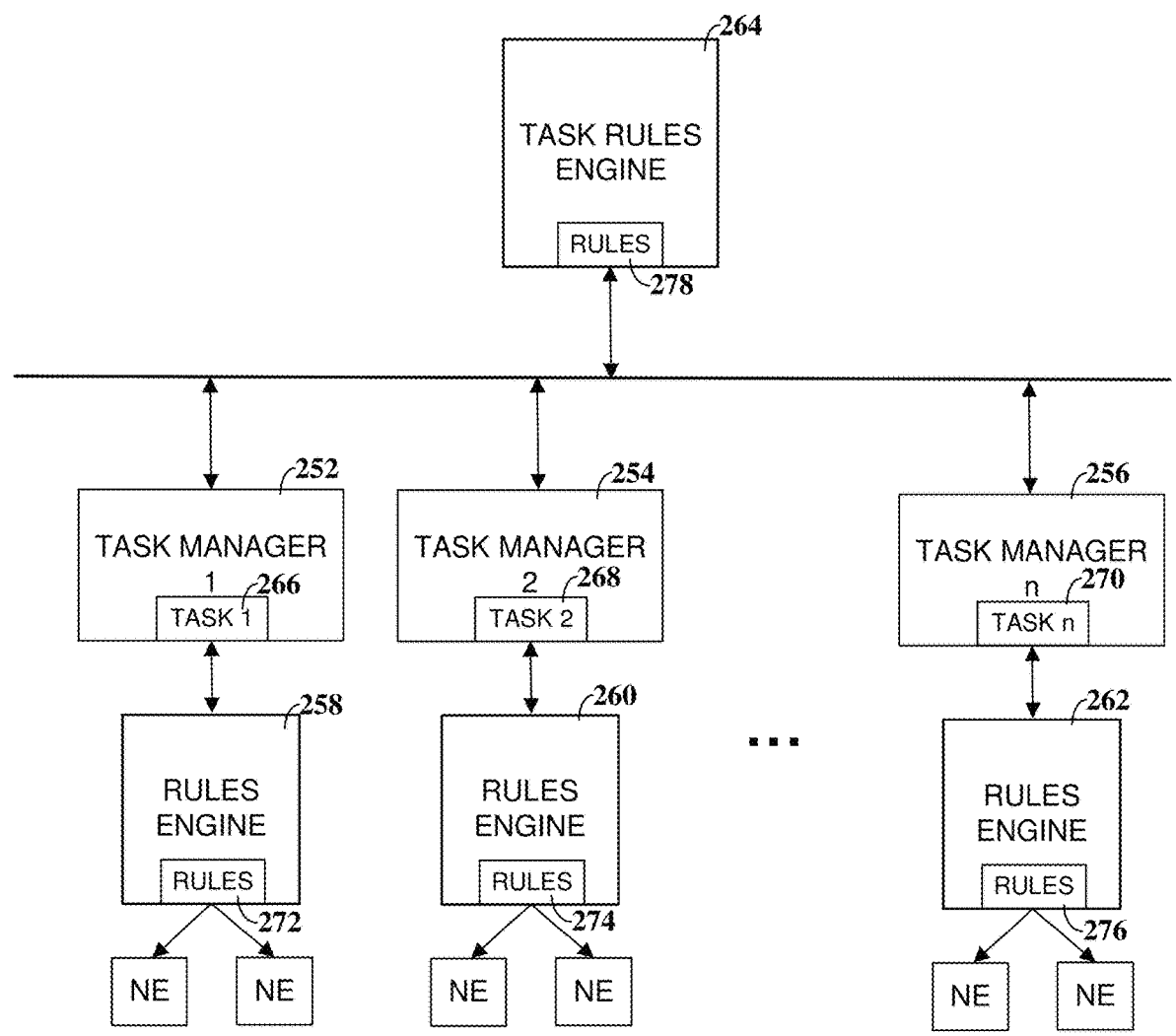
FIG. 2F is a functional block diagram illustrating an example, non-limiting embodiment of a business process visualization system, for use with a business process management tool, in accordance with various aspects described herein.

FIG. 2F is a functional block diagram illustrating an example, non-limiting embodiment of a business process visualization system 250, for use with a business process management tool, in accordance with various aspects described herein. The business process management (BPM) tool may be used to establish a BPM system for initiating, controlling and monitoring a business process.

Any suitable business process may be the subject of the BPM tool, including manufacturing systems, telecommunication systems, financial management systems, and others. In an example, a BPM tool is used to facilitate and install and begin operation of a communications network. The communications network may be a wireline network, including a local area network (LAN) in an office other space. The communications network may be a wireless network, including a cellular communications network providing communication service to a wide area. The communication network may be a broadband communications network providing one-way or two-way data communications from one or more locations to remote locations.

In exemplary applications of a BPM tool, the business process may be segmented into a number of discrete tasks. The tasks may include, for example, steps such as ordering equipment, delivering equipment to a site, installing the equipment, initiating communication via the equipment, troubleshooting the equipment, approval of the installation of the equipment and, longer term, operation and maintenance of the equipment. Each task may include subtasks required to complete the task.

The business process visualization system 250 illustrates a system and method for implementing and organizing a process that includes a number of discrete tasks. The business process visualization system 250 includes a first task manager 252, a second task manager 254 and an n-th task manager 256. Each respective task manager has a respective rules engine associated therewith. Thus, the first task manager 252 is associated with a rules engine 258, the second task manager 254 is associated with a rules engine 260 and the n-th task manager 256 is associated with a rules engine 262. The process is controlled by a task rules engine 264.

The number of task managers instantiated in the business process visualization system 250 depends on the number of tasks which form the process. The number of task managers generally matches the number of tasks in the process. Each respective task manager controls a respective task. Thus, the first task manager 252 is associated with a task 266, the second task manager 254 is associated with a task 268 and the n-th task manager 256 is associated with a task 270. In the exemplary embodiment, n tasks are shown but n may be any suitable number.

Each respective rules engine implements a set of rules to accomplish the task with which the rules engine is associated. Thus, rules engine 258 implements a set of rules 272, rules engine 260 implements rules 274 and rules engine 262 implements rules 276. The respective rules engines may implement one or more artificial intelligence (AI) or machine learning (ML) processes. An exemplary AI process implemented in an exemplary rules engine is a neural network to map input data to outputs based on learned patterns.

The business process visualization system 250 illustrates segmentation between a task level and a rules level. The task level includes tasks such as task manager 252, task manager 254 and task manager 256. The rules level includes rules engine 258, rules engine 260 and rules engine 262. Tasks or task managers on the task level may be nested to form a hierarchy or levels of tasks while remaining on the task level. Similarly, rules within the rules level may be nested. Nesting allows multiple tasks or rules to be completed as separate steps toward completion of a respective task or rule.

A process to be modelled by the business process visualization system 250 is developed by one or more operators with familiarity with the process. The human operators have relatively high knowledge of tasks required for the process but may lack the detailed knowledge of technical operations required by each task of the process. Thus, the tasks may be selected and specified by the operators, for example using a graphical user interface (GUI) such as GUI 200 described in conjunction with FIGS. 2A-2E. The GUI may allow operators to assemble respective tasks, for example, using a drag and drop interface to instantiate tasks for the process. Further, the GUI may allow the operators to specify dependencies among various tasks. Thus, a first task may require completion of a second task before the first task may begin. Any suitable dependency may be defined, including temporal and spatial dependencies.

The task rules engine 264 is associated with a set of task rules 278. The task rules engine 264 responds to the task rules 278 to implement the overall process, including any dependencies defined by the operators. As the operators define the process, the task rules 278 are established to define detailed task calls. The task calls are processed by the task rules engine 264 to call the respective tasks at the task level, including task manager 252, task manager 254 and task manager 256.

To implement a task, each respective task manager is associated with a rules engine. Each rules engine implements a set of rules to accomplish the task with which the task manager is associated. The rules engine interacts with other components such as network elements (NE) to accomplish the task. For example, the rules engine may collect data and other information from a NE or provide information to an NE. The rules engine may share data or other information between NEs. Each NE may include any equipment or process or device or personnel required to complete the task according to the rules of the rules engine.

The task at the task level is defined at a relatively high level, such as a level that the operators who define the process are familiar. In contrast, the rules at the rules level are defined at a detailed, technical level, typically at a level of detail and granularity not known by the operators. The rules may include one or more artificial intelligence environments, such as a neural network. The AI environments are implemented by the respective rules engines. As the AI environments implement a set of rules over many tasks, the AI environments of the rules engines learn to more efficiently implement the rules. For example, a neural network implemented by a rules engine such as rules engine 258, rules engine 260 or rules engine 262, may learn a set of inputs to a task and a set of outputs to the task and develop a network to efficiently connect the inputs to the outputs.

The rules of each respective rules engine are tailored to completion of the task with which the rules engine is associated. The rules may be developed by software engineers or other technical contributors with detailed knowledge of a task and the steps required to complete the task. For example, FIG. 2E includes an Uplink Design task 222. This may be one task within a process to design a cellular network for a region. The operators who design the process may be aware of high-level steps required for such a process, including identifying cell sites for the network, ordering equipment for the cell sites, delivering the equipment to the cell sites and installing the equipment to the cell sites and designing the uplink for the cell sites, the Uplink Design task 222. The operators may not know the details of uplink design, including radio network standards requiring compliance, radio engineering best practices, etc. The design of the Uplink Design task 222 itself may be delegated to a team of radio engineers with technical knowledge and experience to design the radio uplink. The team of radio engineers in turn will design the set of rules required for the step of designing the radio uplink. In some examples, the rules to design the radio uplink may include one or more AI processes. In this manner, the operators working at the task level to assemble the overall process need not know the details of each individual task, such as designing a radio uplink. Similarly, the technical contributors operating at the rule level need not know all the aspects of the overall process of designing a cellular network, including details of siting and delivering equipment.

In accordance with various aspects described herein, communication in the BPM tool and the business process visualization system 250 is tightly controlled. Tasks at the task level can communicate with each other. A rule on the rules level and its associated task on the task level can communicate with each other. However, individual rules on the rules level cannot communicate with each other. A task may communicate with other tasks via parameters. A task may communicate with its associated rules or rules engine via parameters. Parameters may specify a task, for example the task name or other identification information, a task state or a value of a parameter. Any suitable information may be defined by or specified by parameters. As the process progresses, additional parameters may be defined and assigned with values in order to communicate information about the progress of the process.

Figure 2G:
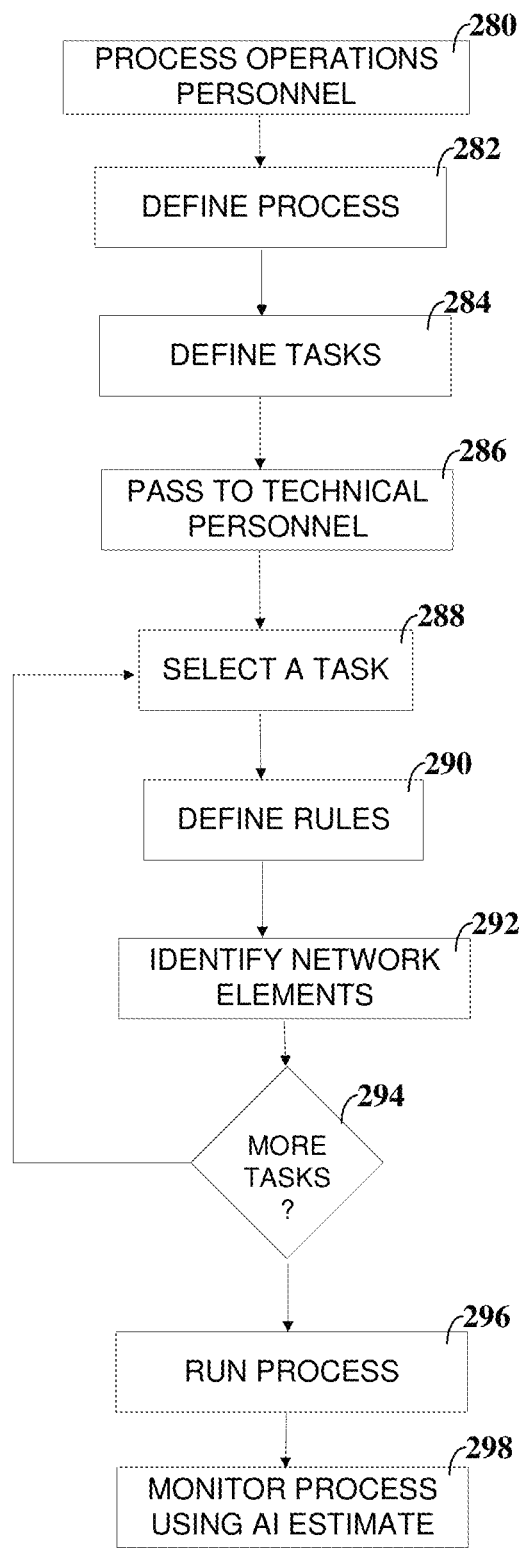
FIG. 2G depicts an illustrative embodiment of a method in accordance with various aspects described herein.

FIG. 2G depicts an illustrative embodiment of a method 279 in accordance with various aspects described herein. The method 279 may find particular use for use of artificial intelligence-based business process management (BPM) visualization, development, and monitoring. The method 279 may be used in conjunction with the widest variety of business processes including manufacturing processes, financial processes and processes for provision of services including customer service, telecommunication services and others.

The method 279 in the illustrated embodiment begins at block 280 with process operations personnel. The process operations personnel may include one or more human individuals with knowledge or experience of the process to be monitored. Such knowledge and experience may be limited to relatively high-level information, such as physical items required for the process, physical locations required for the process and personnel and timing for the process.

At block 282, the process is defined. Defining the process may include steps of understanding inputs the process, understanding the desired result of the process, understanding requirements for the process and limitations placed on the process. Defining the process may further include steps of understanding timing and defining steps to be accomplished by the process. The design of the process may be achieved using project management tools and technology. Such tools and technology may include conventional tools such as Business Process Modelling Work Breakdown Structure (WBS), Gantt charts, Kanban, and others. Thus, a project manager or operator may use a graphical user interface to design a project such as by dragging and dropping graphical features corresponding to tasks on a user interface and subsequently defining features and parameters of the tasks. A data processing system or computer will monitor the tasks and parameters as the process proceeds and update information for the project manager.

At block 284, one or more tasks are defined for the process. Conventional processes typically comprise a number of tasks that must be complete for completion of the process. Conventionally, the tasks are completed according to some sequence, one task at a time. The process and its constituent tasks are conceived in a linear fashion. However, often there is no direct linear relationship between respective tasks. Instead, each individual task of the process may have its own input and output criteria. Therefore, the set of tasks may be defined according to inputs from other tasks. The tasks may be arranged in a time-wise arrangement, taking into account the requirements, limitations and other available information. The tasks may be arranged hierarchically so that one task calls or instantiates a set of other, subordinate tasks. Generally, the tasks are defined at a relatively high level, such as "Place server computer online in active state."

At block 286, the process design is passed from the operations personnel to technical personnel. The technical personnel may include one or more human individuals with skill and expertise in particular individual operations or technology required by the tasks defined for the process. Such personnel may include engineers and technicians with skill and experience to design or install required hardware, software and other elements needed to perform the tasks in an efficient and reliable manner.

At block 288, a task define by the operations personnel is selected for analysis. The task may be assigned to a particular engineering group with appropriate expertise to implement the functions and devices required for the task. The group develops a set of rules necessary to complete the task. In an embodiment, more than a single task is selected or assigned so that work at defining necessary rules for some or all of the tasks proceeds in roughly parallel time.

At block 290, rules necessary to complete the task are defined and created. In general, rules exist at a lower level that is a more detailed level and a more technical level than a task. For example, the task, "Place server computer online in active state" may include rules of Purchase server computer; receive server computer from dealer; move server computer to required site; provide electrical and network communication service to the required site; install server computer; install server software on server computer; initiate network operation of the server computer; test and troubleshoot server computer; and server computer online and ready to run." The technical personnel responsible for defining these rules have the skill and expertise to understand the requirements for the task selected or assigned at block 288 and to break the task down into constituent steps or rules. Rules may be defined with inputs and outputs and dependencies.

At block 292, necessary network elements (NE) are identified for the rules. Network elements may include any components required to perform or complete a rule. Examples include computer hardware or software, equipment or contractors for moving or relocating other equipment, personnel required for a rule, communication equipment and components, and others. Such network elements may be obtained and provisioned as necessary for the completion of the task.

At block 294, a looping operation occurs to determine if there are further tasks defined for the process at block 284 that still need to have rules defined and network elements provisioned. If so, control returns to block 288 and one or more further tasks are attended to. If there are no further tasks defined for the process, control proceeds to block 296.

Embodiments including the method 279 may thus operate at two different levels. A first level may be termed a task level or process manager level. The task level is at a relatively high level in which tasks and interactions and dependencies are not defined in detail. The task level is useful for an operator who has a general familiarity with the process including tasks to be completed but not with details of the individual tasks themselves. In the example of FIG. 2G, block 282, 284 and 286 may be considered to be at the task level. A second level may be termed the rule level and may include block 288, block 290 and block 292. The rule level is focused on the technical details of each respective task. Individuals involved in developing rules have particular, focused technical expertise related to the subject matter of a particular rule.

Some or all rules for completion of a task may include artificial intelligence (AI) aspects or features. The AI features may use a training set of data to develop a machine learning model, for example, and use the intelligence to enhance completion of a rule. Some AI features will incorporate a non-deterministic path or algorithm into a rule or a task with the result being that execution of the rule may not be fully predictable and may be difficult to visualize and monitor.

In accordance with some embodiments, a task may only communicate information with rules that are defined for that task. Communication is by passing parameters and parameter values between the task, or a computer process running on a data processing system performing the task, and a rule or a computer process performing or monitoring performance of the rule. Defining a task, block 284, and defining rules for the task includes defining parameters and possible parameter values. An example parameter is, "install electric supply for server computer," and possible values include "complete" and "not complete."

Further in accordance with some embodiments, rules associated with one task may not communicate with rules of other tasks. A rule associated with a task may not set or pass a parameter for communication to or use by another rule. Rather, the rule may set a parameter for communication with the associated task. The associated task, at the task level, may communicate with another task by passing that parameter, or information based on that parameter, to another task. The other task, in turn, may pass the parameter or other information to a rule associated with the other task.

At block 296 of FIG. 2G, once tasks and rules are defined, the process is run. Running the process includes providing information at the task level to operators who monitor the process. Such information may be provided using a graphical user interface on a computer system, or by any other convenient means. An example of a suitable interface may be a computer-generated Kanban in which the Kanban is updated using information provided by individual tasks and individual rules.

Due to the AI nature of the system and method, the system and method may not follow a deterministic path and therefore machine learning is used here to predict the actions of the AI system and update the project process in a way that is consistent with the project management infrastructure. The net effect is that the operators face a process which is analogous to "explaining the job to a group of expert technicians and then periodically asking them for their expert opinion on where the project is" as opposed to "specifying detailed instructions to a group of robots and then trying to analyze their programming to see what is going on."

At block 298, an artificial intelligence estimate of process status is generated. The operator may interact with the user interface to obtain information about a task or the process. For example, the operator may click on an image or object on the user interface to select the object and the system provides information about the selected object. In an embodiment, a machine learning (ML) process monitors what processes are occurring over time, during repeated executions of tasks and rules within tasks. The ML process or system will learn over time what conditions lead to what kind of outcomes. From that information, the ML process can predict what rules will trigger, and in what order. The ML system can predict a flow for a process. The ML system uses a training set of inputs and outputs to determine patterns and significant parameters and use the patterns to make future predictions.

The ML system can inform the operator, using the user interface, at the task level, the current state of the process, or a prediction of the current state. The ML system can make predictions on how long rules and tasks will take to complete because the ML system has information about required duration for such rules and tasks. The ML system gives a view to the operator of current status, time remaining, and ordering of processes, based on predictions. The ML system can draw a timeline showing process status, how rules execute, and predict if a process is on schedule, behind schedule or ahead of schedule, and what would be likely outcomes.

While for purposes of simplicity of explanation, the respective processes are shown and described as a series of blocks in FIG. 2G, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
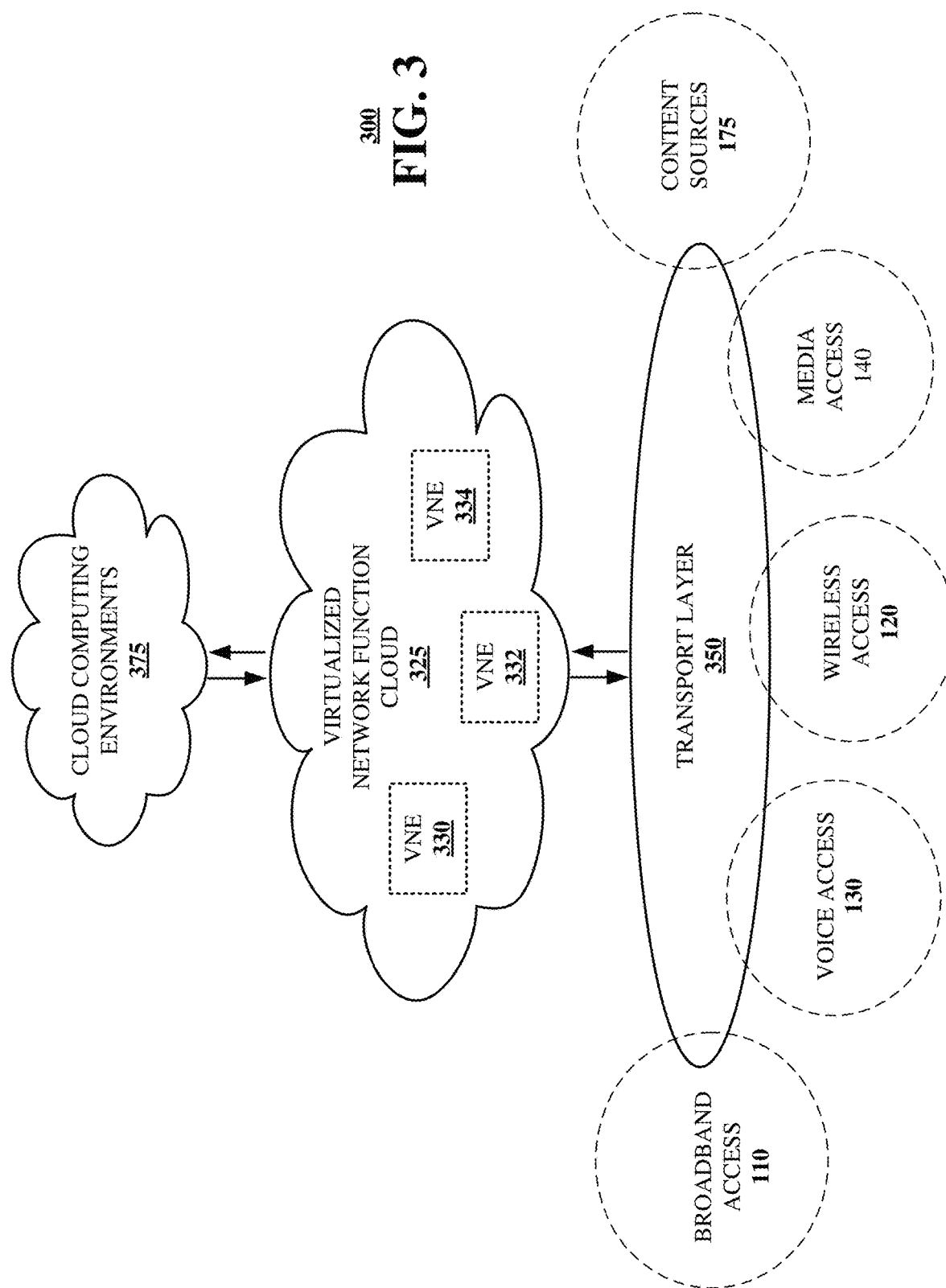
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of systems implementing business process management tool 202, and method 278 presented in FIGS. 1, 2A-2G, and 3. For example, virtualized communication network 300 can facilitate in whole or in part a business process management system, using high level tasks at a task level and technical rules at a rule level, for visualizing and monitoring a process to be performed.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
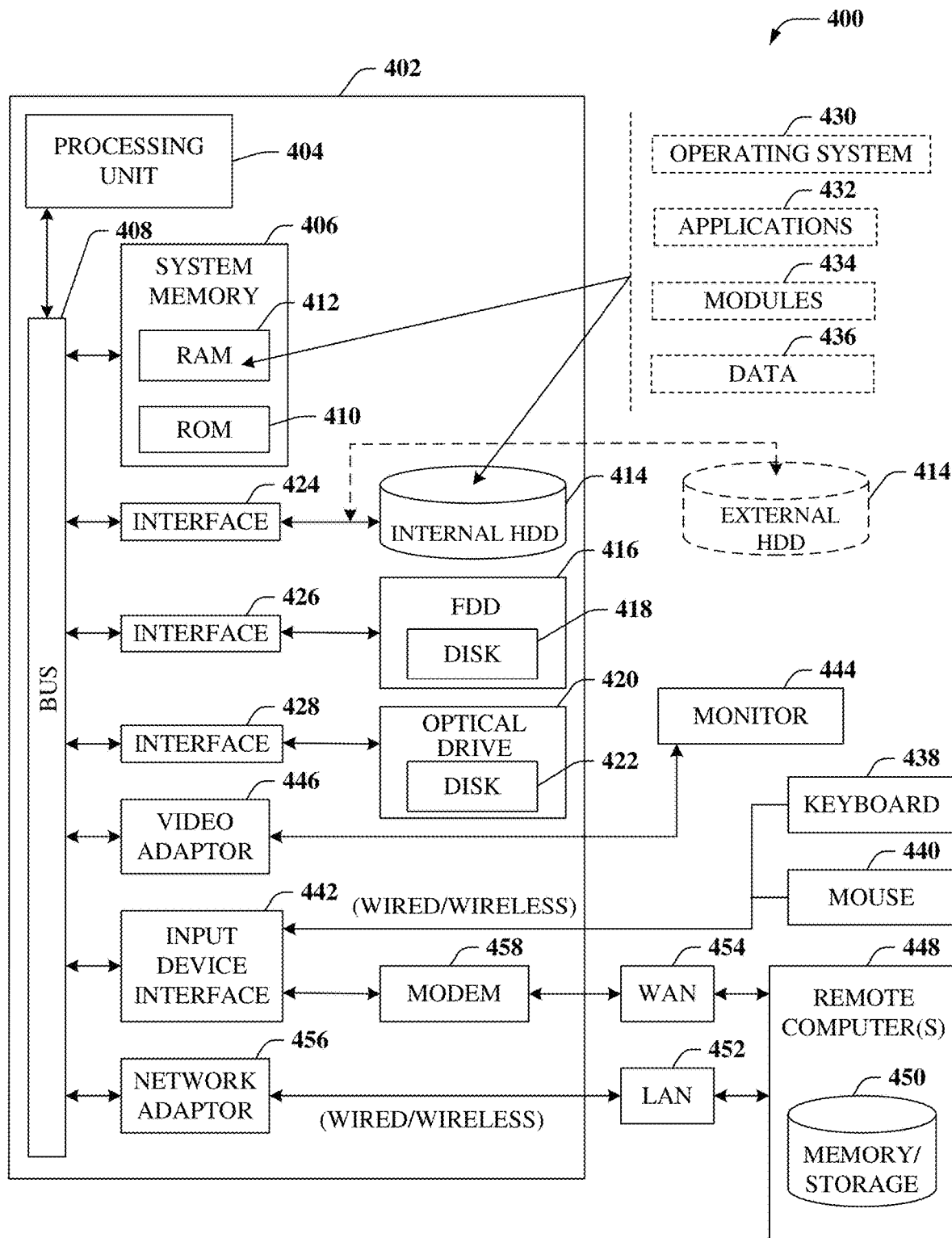
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part a business process management system that uses high level tasks at a task level and technical rules at a rule level, for visualizing and monitoring a process to be performed.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
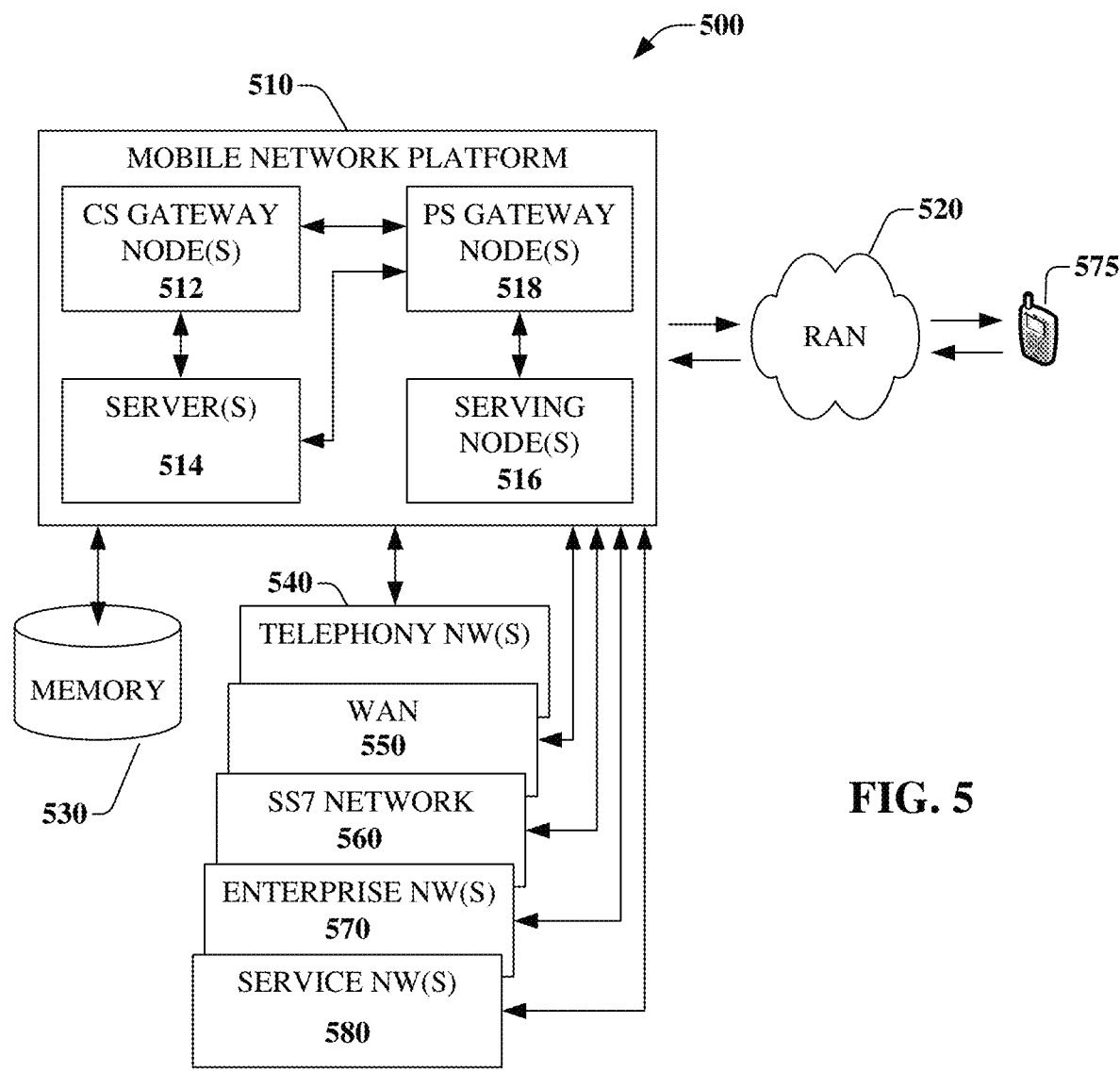
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part a business process management system that uses high level tasks at a task level and technical rules at a rule level, for visualizing and monitoring a process to be performed. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
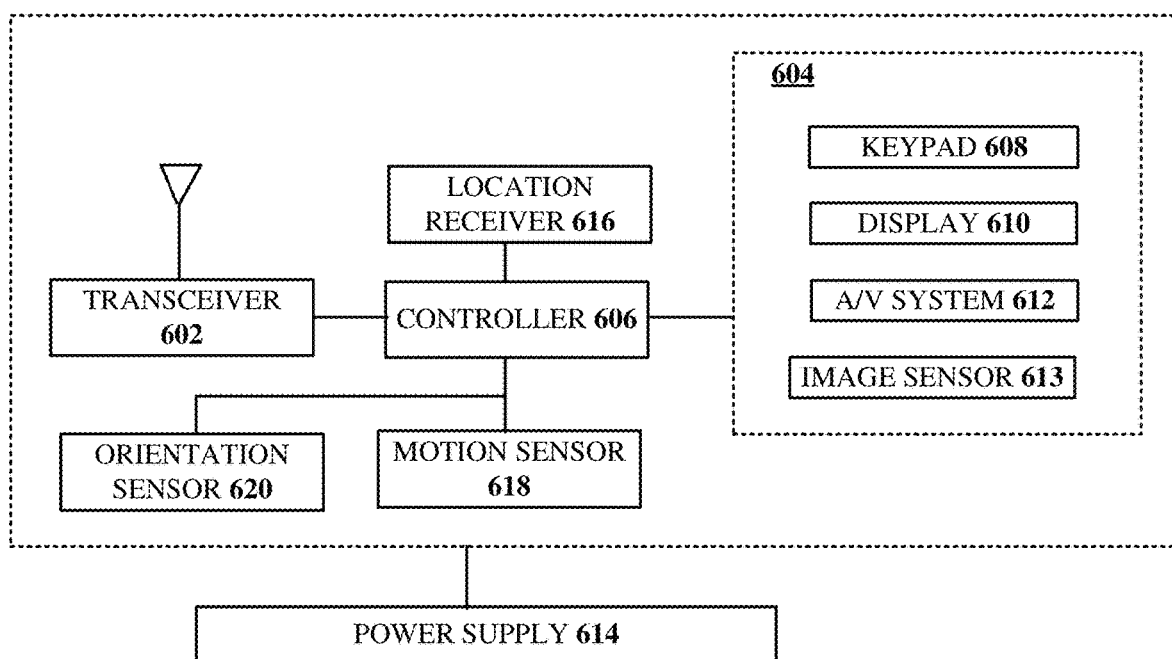
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part a business process management system, using high level tasks at a task level and technical rules at a rule level, for visualizing and monitoring a process to be performed.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signalingstream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
receiving, from an operator for a process, wherein the process is performed remotely under control of an artificial intelligence system of a control computer, first information defining one or more tasks, the one or more tasks to perform the process;
receiving, from technical personnel, respective rulesets associated with respective tasks of the one or more tasks, each respective ruleset defining procedures to complete a respective task;
initiating a machine learning process, the machine learning process operative to monitor progress of tasks of the one or more tasks based on completion of selected rulesets associated with a selected task, wherein the machine learning process is operative to predict a current status of the process when there is no actual knowledge of the process due to operation of the artificial intelligence system, the machine learning process being trained on inputs and output of the artificial intelligence system to make future predictions about operation of the artificial intelligence system;

communicating second information about a task between the task and an associated ruleset, wherein the communicating comprises exchanging parameters and parameter values for the task or procedures of the associated ruleset;

preventing communication of information between a selected task and any ruleset other than a selected ruleset associated with the selected task and preventing communication of information between any two or more rulesets of the respective rulesets to enable one or more portions of the process to be isolated, tested and corrected if necessary;

displaying, to the operator, third information about the one or more tasks on a graphical user interface during performance of the process, wherein the third information is based on task information received from the machine learning process;

displaying the graphical user interface to enable the operator to monitor and interact visually with the one or more tasks via the graphical user interface, wherein the graphical user interface includes an operator selectable popup menu, wherein the operator selectable popup menu is presented to the operator to select the one or more tasks;

prompting, via the graphical user interface, the operator to drag-and-drop to instantiate tasks for the process, wherein the graphical user interface allows the operator to specify dependencies among various tasks of the one or more tasks;

displaying fourth information on the graphical user interface about the respective rulesets during the performance of the process, wherein the fourth information is based on rule information received from the machine learning process;

receiving, from the machine learning process, information about an error condition of a failed ruleset;

displaying on the graphical user interface for the operator an indication of the error condition of the failed ruleset with a task associated with the failed ruleset of the process on the graphical user interface; and receiving, from the operator at the graphical user interface, an instruction to initiate corrective action to correct the error condition, wherein the initiating the corrective action comprises identifying an abnormal condition in the process based on the information associated with the machine learning process and sending a reset signal to reset operation of the control computer, the reset signal operative to reset a task associated with the failed ruleset and thereafter to resume performance of the task associated with the failed ruleset.

2. The device of claim 1, wherein the receiving first information defining one or more tasks comprises:
receiving dependency information defining a task dependency; and
wherein the receiving respective rulesets comprises receiving task rulesets based on the task dependency, the task rulesets including at least one rule that does not trigger until the task dependency is satisfied by a prior task during the performance of the process.

3. The device of claim 1, wherein the receiving first information defining one or more tasks comprises:
receiving, for each respective task, identification information for the respective task, information defining a state for the respective task, and dependency information defining task dependencies for the respective task.

4. The device of claim 3, wherein the operations further comprise:
invoking, for a particular task, a particular ruleset for the particular task, wherein the invoking comprises using at least a portion of the identification information for the particular task in a uniform resource locator (URL) for the particular ruleset.

5. The device of claim 4, wherein the particular ruleset for the particular task comprises a computer program including executable instructions and wherein the computer program is accessed at the URL for the particular ruleset.

6. The device of claim 1, wherein the operations further comprise:
preventing a first respective ruleset of the respective rulesets from communicating information directly with a second respective ruleset of the respective rulesets during the performance of the process.

7. The device of claim 1, wherein the receiving first information defining one or more tasks comprises:
receiving, on the graphical user interface, graphical information defining the one or more tasks; and
receiving, on the graphical user interface, graphical information defining task dependencies among the one or more tasks.

8. The device of claim 7, wherein the displaying third information about the one or more tasks on a graphical user interface comprises:
displaying a Kanban for the process on the graphical user interface.

9. A method, comprising:
receiving, by a processing system including a processor, information defining one or more tasks, the one or more tasks to perform a process, wherein the process is performed remotely under control of an artificial intelligence system of a control computer;

receiving, by the processing system, information defining respective rulesets associated with respective tasks of the one or more tasks, each respective ruleset defining procedures to complete a respective task;

preventing communication of information between a selected task of the one or more tasks and any ruleset of the respective rulesets other than a selected ruleset associated with the selected task;

preventing communication of information between any two or more rulesets of the respective rulesets;

initiating a machine learning process, the machine learning process operative to monitor progress of tasks of the one or more tasks based on completion of selected rulesets associated with a selected task, wherein the machine learning process is operative to predict a current status of the process when there is no actual knowledge of the process due to operation of the artificial intelligence system, the machine learning process being trained on inputs and output of the artificial intelligence system to make future predictions about operation of the artificial intelligence system communicating, by the processing system, information about a task between the task and an associated ruleset, wherein the communicating comprises exchanging parameters and parameter values for the task or procedures of the associated ruleset;

displaying, by the processing system, to an operator on a client device, information about the one or more tasks on a graphical user interface during performance of the process, wherein the displaying comprises displaying a Kanban for the process on the graphical user interface during performance of the process, wherein the graphical user interface includes an operator selectable popup menu, wherein the operator selectable popup menu is presented to the operator to select the one or more tasks;

displaying, by the processing system via a visualization system, the graphical user interface to enable the operator to monitor and interact visually with the one or more tasks via the graphical user interface;

prompting, by the processing system via the graphical user interface, the operator to drag-and-drop to instantiate tasks for the process, wherein the graphical user interface allows the operator to specify dependencies among various tasks of the one or more tasks;

receiving, from the machine learning process, information about an error condition of a failed ruleset displaying, by the processing system to the operator, an indication of the error condition of the failed ruleset of the process on the graphical user interface; and receiving, from the operator at the graphical user interface, an instruction to initiate a corrective action to correct the error condition at the control computer, wherein the initiating the corrective action comprises identifying an abnormal condition in the process based on the information associated with the machine learning process and sending a reset signal to reset operation of the control computer, the reset signal operative to reset a task associated with the failed ruleset and thereafter to resume performance of the task associated with the failed ruleset.

10. The method of claim 9, wherein the receiving information defining one or more tasks comprises:

receiving, by the processing system, for each respective task, identification information defining a unique identification for the respective task, state information defining a state for the respective task, and dependency information defining task dependencies for the respective task.

11. The method of claim 10, wherein the displaying a Kanban for the process on the graphical user interface comprises:

displaying, by the processing system, state graphical representations of two or more process states; and displaying, by the processing system, task graphical representations of each respective task, wherein the task graphical representations are positioned on the graphical user interface in relation to the state graphical representations according to the information defining a state for the respective task.

12. The method of claim 10, further comprising:

updating, by the processing system, the state information responsive to a change of state of a particular task; and updating, by the processing system, the graphical user interface based on updated state information.

13. The method of claim 12, further comprising receiving from a ruleset associated with the particular task an indication that the particular task is complete, wherein the updating the state information is responsive to the indication.

14. The method of claim 9, further comprising:

receiving, by the processing system, information defining one or more task dependencies; and providing, by the processing system, a visual indication on the graphical user interface of the one or more task dependencies.

15. The method of claim 9, wherein the operations further comprise providing, at the graphical user interface, an indication of the error condition to prompt the operator to initiate a correction of the error condition including dispatching a service crew to correct the error condition at the control computer.

16. A non-transitory machine-readable medium, comprising executable instructions that, when executed by a processing system including a processor, facilitate performance of operations, the operations comprising:

receiving, by a processing system including a processor, information defining one or more tasks, the one or more tasks to perform a process, wherein the process is performed remotely under control of an artificial intelligence system of a control computer;

receiving, by the processing system, information defining respective rulesets associated with respective tasks of the one or more tasks, each respective ruleset defining procedures to complete a respective task;

preventing communication of information between a selected task of the one or more tasks and any ruleset of the respective rulesets other than a selected ruleset associated with the selected task;

preventing communication of information between any two or more rulesets of the respective rulesets;

communicating, by the processing system, information about a task between the task and an associated ruleset, wherein the communicating comprises exchanging parameters and parameter values for the task or procedures of the associated ruleset;

initiating a machine learning process, the machine learning process operative to monitor progress of tasks of the one or more tasks based on completion of selected rulesets associated with a selected task, wherein the machine learning process is operative to predict a current status of the process when there is no actual knowledge of the process due to operation of the artificial intelligence system, the machine learning process being trained on inputs and output of the artificial intelligence system to make future predictions about operation of the artificial intelligence system;

displaying information about the one or more tasks to an operator on a graphical user interface during performance of the process, wherein the displaying comprises displaying a Kanban for the process on the graphical user interface during performance of the process, wherein the information about the one or more tasks is based on task information received from the machine learning process, wherein the graphical user interface includes an operator selectable popup menu, wherein the operator selectable popup menu is presented to the operator to select the one or more tasks;

displaying the graphical user interface to enable the operator to monitor and interact visually with the one or more tasks via the graphical user interface;

prompting, via the graphical user interface, the operator to drag-and-drop to instantiate tasks for the process, wherein the graphical user interface allows the operator to specify dependencies among various tasks of the one or more tasks;

receiving, from the machine learning process, information about an error condition of a failed ruleset;

displaying an indication of the error condition of the failed ruleset with a task associated with the failed ruleset of the process on the graphical user interface; and receiving, from operations personnel at the graphical user interface, an instruction to initiate a corrective action to correct the error condition, wherein the initiating the corrective action comprises identifying an abnormal condition in the process based on the information from the machine learning process about the error condition of the failed ruleset and sending a reset signal to reset operation of the control computer, wherein the reset signal is operative to reset a task associated with the failed ruleset and thereafter to resume performance of the task associated with the failed ruleset.

17. The non-transitory machine-readable medium of claim 16, wherein the operations further comprise:
receiving dependency information defining a task dependency; and
wherein the receiving respective rulesets comprises receiving task rulesets based on the task dependency, the task rulesets including at least one rule that does not trigger until the task dependency is satisfied by a prior task during the performance of the process.

18. The non-transitory machine-readable medium of claim 16, wherein the operations further comprise:
receiving, for each respective task, identification information for the respective task, information defining a state for the respective task, and dependency information defining task dependencies for the respective task.

19. The non-transitory machine-readable medium of claim 18, wherein the operations further comprise:
invoking, for a particular task, a particular ruleset for the particular task, wherein the invoking comprises using at least a portion of the identification information for the particular task in a uniform resource locator (URL) for the particular ruleset.

20. The non-transitory machine-readable medium of claim 16, wherein the operations further comprise:
preventing a first respective ruleset of the respective rulesets from communicating information directly with a second respective ruleset of the respective rulesets during the performance of the process.

* * * * *